(12) United States Patent
Satou et al.

(10) Patent No.: US 11,334,045 B2
(45) Date of Patent: May 17, 2022

(54) DIAGNOSIS APPARATUS AND DIAGNOSIS METHOD

(71) Applicant: FANUC CORPORATION, Yamanashi (JP)

(72) Inventors: Kazuhiro Satou, Yamanashi (JP); Yoshitaka Kubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 180 days.

(21) Appl. No.: 16/888,859

(22) Filed: Jun. 1, 2020

(65) Prior Publication Data
US 2020/0401098 A1 Dec. 24, 2020

(30) Foreign Application Priority Data
Jun. 18, 2019 (JP) .............................. JP2019-112630

(51) Int. Cl.
 *G05B 19/042* (2006.01)
 *G06K 9/62* (2022.01)
 *G06N 20/00* (2019.01)

(52) U.S. Cl.
 CPC ....... *G05B 19/0428* (2013.01); *G06K 9/6227* (2013.01); *G06N 20/00* (2019.01)

(58) Field of Classification Search
 None
 See application file for complete search history.

(56) References Cited

U.S. PATENT DOCUMENTS

| 8,532,865 | B2 * | 9/2013 | Suzuki | E02F 9/2054 |
| | | | | 701/29.1 |
| 9,905,062 | B2 * | 2/2018 | Fujimori | E02F 9/267 |
| 10,732,606 | B2 * | 8/2020 | Higashi | G05B 19/4065 |
| 2007/0088454 | A1 * | 4/2007 | Jalluri | G05B 19/4065 |
| | | | | 700/159 |
| 2019/0179297 | A1 * | 6/2019 | Kuroda | G06N 20/00 |
| 2019/0265657 | A1 | 8/2019 | Inagaki et al. | |
| 2020/0114608 | A1 * | 4/2020 | Harada | B30B 15/148 |

FOREIGN PATENT DOCUMENTS

JP 201733526 A 2/2017

OTHER PUBLICATIONS

Zhao et al., "Deep Learning and Its Applications to Machine Health Monitoring: A Survey," IEEE, 2015, 14pg. (Year: 2015).*

* cited by examiner

*Primary Examiner* — Ryan D. Coyer
(74) *Attorney, Agent, or Firm* — Hauptman Ham, LLP

(57) ABSTRACT

A plurality of learning models generated by performing machine learning on physical quantities observed during respective operations of a plurality of machines are stored in advance. Then, using the stored learning models and a physical quantity observed during an operation of a machine which is an object to be diagnosed, characteristic differences between the machine which is the object to be diagnosed and the plurality of respective machines are calculated, a learning model used in a diagnosis of the operation of the machine which is the object to be diagnosed is selected based on the calculated characteristic differences, and the operation of the machine which is an object to be diagnosed using the selected learning model is diagnosed.

5 Claims, 9 Drawing Sheets

DIAGNOSIS APPARATUS AND DIAGNOSIS METHOD

RELATED APPLICATIONS

The present application claims priority to Japanese Patent Application Number 2019-112630 filed Jun. 18, 2019, the disclosure of which is hereby incorporated by reference herein in its entirety.

BACKGROUND OF THE INVENTION

Field of the Invention

The present invention relates to a diagnosis apparatus and a diagnosis method.

Description of the Related Art

As a method for diagnosing a state of an industrial machine such as a machine tool and a robot, there has been known a method which performs a diagnosis where a model used for predetermined diagnosis is formed for respective industrial machines, and performs diagnosis based on data acquired from industrial machines by using the formed models (see Japanese Patent Application Laid-Open No. 2017-033526, for example). In this method, irregularities which occur for respective industrial machines individually can be reflected on constructed models based on data acquired during operations of industrial machines and hence, the method has an advantageous effect that accuracy of diagnosis of the industrial machines can be enhanced. On the other hand, to form a model which can diagnose a state of an industrial machine with high accuracy, a sufficient amount of data (learning data) is necessary and hence, it may take one or two months or more depending on frequency of collection of data.

On a site of a factory or the like where an industrial machine is installed, an operation which uses an industrial machine is performed immediately after the introduction of the industrial machine. However, at a stage before a model of a diagnosis relating to the industrial machine is constructed, that is, at a stage before learning data used for constructing the model is sufficiently acquired, an operation of the industrial machine cannot be diagnosed. To overcome such a drawback, in the case where a model of other industrial machine of the same type as the newly introduced industrial machine exists, there has been proposed a method where an operation of the newly introduced industrial machine is diagnosed using the model. However, even in the case where the industrial machine of the same type exists, irregularities in characteristics exist for respective individual machines. Accordingly, even in the case where a model constructed for another industrial machine is used in the newly introduced industrial machine, when the difference in characteristics is large between the industrial machine and the newly introduced industrial machine, it is difficult to diagnose an operation of the industrial machine while maintaining predetermined accuracy.

SUMMARY OF THE INVENTION

In view of the above, in newly introducing an industrial machine, there has been desired a technique which selects a model of an individual machine having characteristics close to characteristics of the industrial machine and uses the model in diagnosis of an operation.

According to an aspect of the present invention, there is provided a diagnosis apparatus where learning models are prepared with respect to a plurality of industrial machines and are held in a memory unit in advance, and a difference in characteristic between the industrial machines is calculated using the prepared learning models.

Then, when an industrial machine is newly introduced, a learning model of another industrial machine having a smallest characteristic difference with respect to the industrial machine is used in a diagnosis of the industrial machine. Accordingly, the above-mentioned drawback can be overcome.

According to an aspect of the present invention, there is provided a diagnosis apparatus for diagnosing an operation of a machine, the apparatus including: a learning model storage unit configured to store a plurality of learning models generated by performing machine learning on physical quantities of a plurality of machines observed during respective operations of the plurality of machines in advance; a data acquisition unit configured to acquire a physical quantity of another machine different from the plurality of machines observed during an operation of the other machine; a characteristic difference calculation unit configured to calculate characteristic differences between the other machine and the plurality of respective machines using the physical quantity relating to an operation of the other machine acquired by the data acquisition unit and the learning models stored in the learning model storage unit; a learning model selection unit configured to select a learning model used in a diagnosis of the operation of the other machine based on the characteristic differences calculated by the characteristic difference calculation unit; and a diagnosis unit configured to diagnose the operation of the other machine by using the learning model selected by the learning model selection unit.

The diagnosis unit may diagnose a normal state or an abnormal state of the other machine.

The diagnosis apparatus may further include a learning model adjustment unit configured to adjust the learning model selected by the learning model selection unit to be adaptable to a diagnosis of the operation of the other machine based on the physical quantity relating to the operation of the other machine acquired by the data acquisition unit.

The diagnosis apparatus may further include an operation mode determination unit configured to determine an operation mode of the other machine, wherein the plurality of learning models for respective operation modes generated by performing machine learning on physical quantities observed during operations in the respective operation mode may be stored in the learning model storage unit with respect to the plurality of machines in advance, and the characteristic difference calculation unit may be configured to calculate the characteristic differences by using the learning models generated by the same operation mode as the operation mode determined by the operation mode determination unit.

According to another aspect of the present invention, there is provided a diagnosis method for diagnosing an operation of a machine, the method including: a step of acquiring a physical quantity observed during an operation of a first machine; a step of calculating, using the physical quantity relating to an operation of the first machine acquired in the step of acquiring the physical quantity and a plurality of learning models generated in advance by performing machine learning on physical quantities observed during respective operations of a plurality of machines which differ from the first machine, characteristic differences between the first machine and the plurality of respective machines; a step of selecting a learning model used in a diagnosis of the operation of the first machine based on the characteristic differences calculated in the step of calculating the characteristic differences; and a step of diagnosing the operation of the first machine using the learning model selected in the step of selecting the learning model.

The apparatus and the method according to the present invention have the above-mentioned configuration. Accordingly, by using the learning models prepared for a diagnosis, an operation state of the industrial machine can be diagnosed at a low cost while taking into account the characteristic differences of the individual industrial machines.

DETAILED DESCRIPTION OF THE PREFERRED EMBODIMENTS

Figure 1:
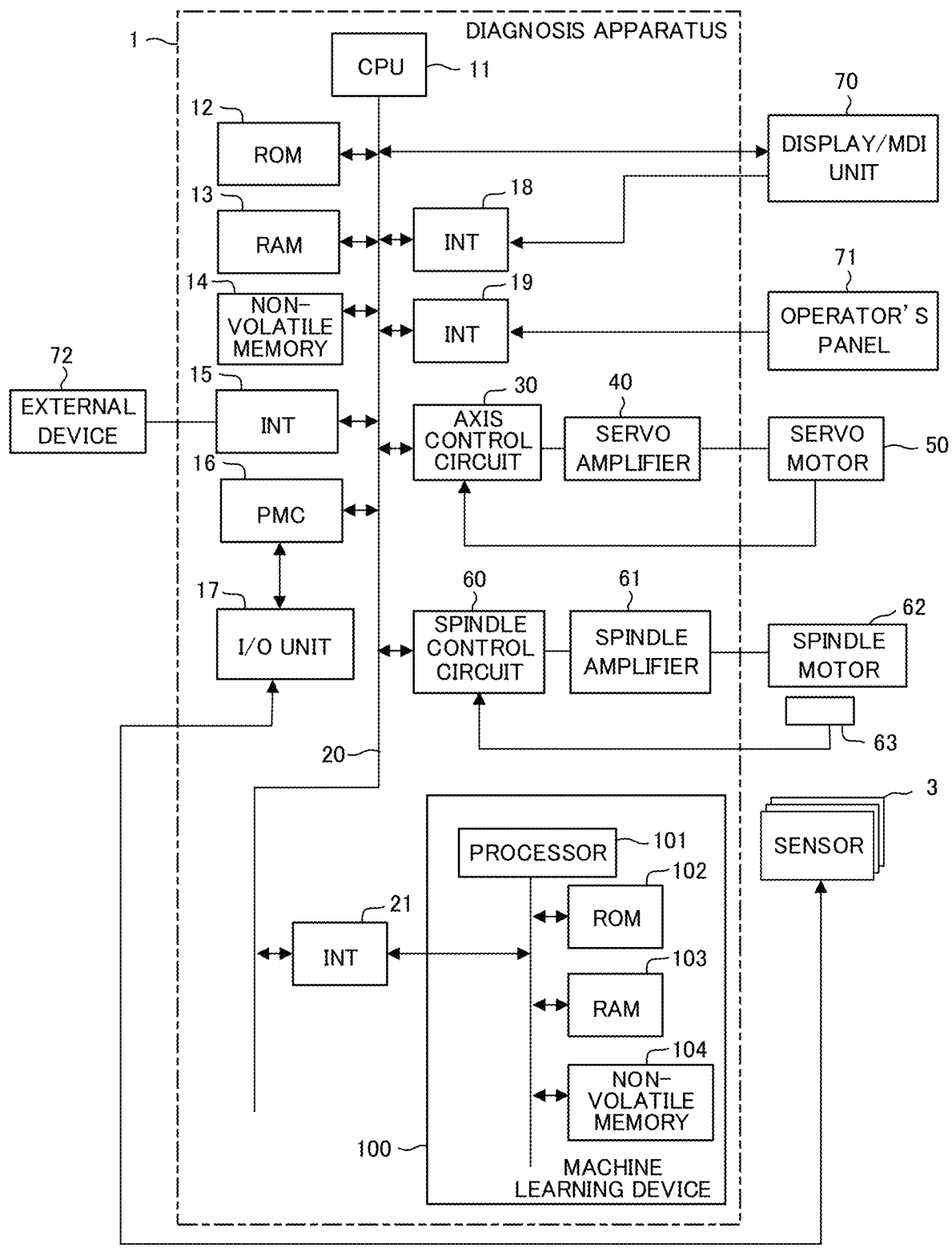
FIG. 1 is a hardware configuration diagram showing a schematic hardware configuration of a diagnosis apparatus according to an embodiment.

FIG. 1 is a hardware configuration diagram showing a schematic hardware configuration of a main part of a diagnosis apparatus equipped with a machine learning device according to an embodiment.

The diagnosis apparatus 1 according to this embodiment can be, for example, mounted on a controller which controls an industrial machine such as a machine tool, or can be mounted as a personal computer arranged parallel to the controller which controls the industrial machine, a management device which is connected to the controller via a wired/wireless network, or a computer such as an edge computer, a fog computer, or a cloud server. In this embodiment, an example of the diagnosis apparatus 1 is shown where the diagnosis apparatus 1 is mounted on the controller which controls the machine tool for diagnosing abnormality of the machine tool.

A CPU 11 provided in the diagnosis apparatus 1 according to this embodiment is a processor which controls the diagnosis apparatus 1 in a comprehensive manner. The CPU 11 reads system programs stored in a ROM 12 via a bus 20 and controls the diagnosis apparatus 1 in a comprehensive manner in accordance with the system programs. In the RAM 13, temporary calculation data and display data, various data input by an operator via an inputting unit (not shown in the drawing) and the like are temporarily stored.

A non-volatile memory 14 is formed as a memory which holds a memory state even when a power source of the diagnosis apparatus 1 is turned off by being backed up by a battery not shown in the drawing, for example. In the non-volatile memory 14, a program read from an external device 72 via an interface 15, a program input via a display/manual data input (MDI) unit 70, and various data acquired from respective units of the diagnosis apparatus 1, the machine tool, sensors 3 and the like (for example, information relating to a tool, information relating to cutting conditions such as a spindle speed, a feed rate, and a cutting amount, information relating to a workpiece such as a material of the workpiece and a shape of the workpiece, electric power consumed by respective motors, vibration, sound, temperatures of respective units of the machine tool and the like which are measured by the sensors 3) are stored. The programs and various data stored in the non-volatile memory 14 may be developed in the RAM 13 at the time of executing or using the programs and various data. In the ROM 12, various system programs such as known analyzing programs (including system programs for controlling the data exchange with a machine learning device 100 described later) are written in advance.

The interface 15 is an interface for connecting the diagnosis apparatus 1 and the external device 72 such as an adopter, and reads programs, various parameters and the like from an external device 72 side. The programs, the various parameters and the like compiled in the diagnosis apparatus 1 can be stored in external memory means via the external device 72. A programmable logic controller (PLC) 16 performs a control by performing inputting and outputting of signals between the devices such as the machine tool and a robot, and the sensors 3 and the like mounted on the machine tool and the robot via an I/O unit 17 in accordance with a sequence program installed in the diagnosis apparatus 1.

The diagnosis apparatus 1 is connected to the sensors 3 such as an acceleration sensor (vibration sensor), a sound detection sensor, and a temperature sensor which are used in processing a workpiece by the machine tool. The sensors 3 are used for measuring vibration and sound generated when the machine tool is operated and temperatures and the like of respective units of the machine tool.

The display/MDI unit 70 is a manual data inputting device which includes a display, a keyboard and the like. An interface 18 receives commands and data from the keyboard of the display/MDI unit 70 and transfers the commands and the data to the CPU 11. An interface 19 is connected to an operator's panel 71 equipped with a manual pulse generator and the like used at the time of manually driving respective axes.

An axis control circuit 30 for controlling respective axes of the machine tool receives axis movement command amounts from the CPU 11, and outputs axis commands to a servo amplifier 40. When the servo amplifier 40 receives such commands, the servo amplifier 40 drives a servo motor 50 which moves the axes which the machine tool includes. A position/speed detector is incorporated in the servo motor 50 for moving the axes, the servo motor 50 feeds back a position/speed feedback signal generated from the position/speed detector to the axis control circuit 30, thereby performing a feedback control of position and speed. In the hardware configuration diagram showing the hardware configuration in FIG. 1, only one axis control circuit 30, one servo amplifier 40, and one servo motor 50 are shown. Note that on the hardware configuration diagram of FIG. 1, the axis control circuit 30, the servo amplifier 40, and the servo motor 50 are each shown singly but in reality are provided in a number corresponding to the number of axes provided in the machine tool serving as the control subject (for example, three of each for a machine tool having three linear axes, or five of each for a five-axis machine tool).

A spindle control circuit 60 receives a spindle rotation command to a spindle of the machine tool, and outputs a spindle speed signal to a spindle amplifier 61. The spindle amplifier 61 receives the spindle speed signal and rotates a spindle motor 62 for the spindle at a commanded rotational speed to drive a tool. A position coder 63 is attached to the spindle motor 62, the position coder 63 outputs a feedback pulse in synchronism with the rotation of the spindle, and the feedback pulse is read by the CPU 11.

An interface 21 is an interface for connecting the bus 20 and the machine learning device 100. The machine learning device 100 includes a processor 101 which controls the machine learning device 100 in a comprehensive manner, a ROM 102 which stores system programs and the like, a RAM 103 which temporarily stores respective processing relating to machine learning, and a non-volatile memory 104 which is used for storing a learning model and the like. The machine learning device 100 can observe respective information (for example, information relating to a tool, information relating to cutting conditions such as a spindle speed, a feed rate, and a cutting amount, information relating to a workpiece such as a material of the workpiece and a shape of the workpiece, electric power consumed by respective motors, vibration, sound, temperatures of respective parts of the machine tool and the like which are measured by the sensors 3) which can be acquired by the diagnosis apparatus 1 via the interface 21. The diagnosis apparatus 1 performs a control of a machine tool, a display on the display/MDI unit 70, transmission of information to other apparatuses via a network and the like by using information output from the machine learning device 100.

Figure 2:
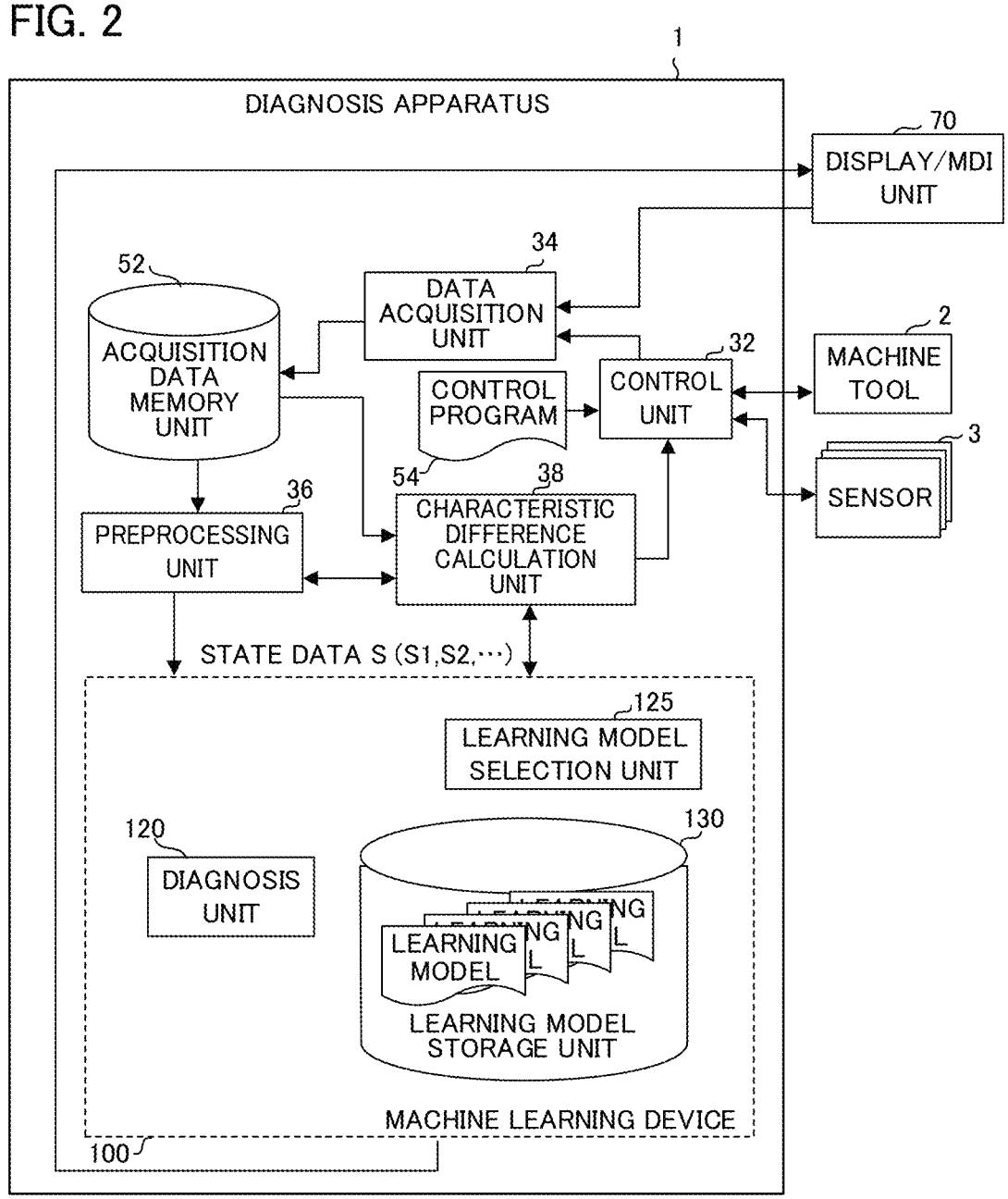
FIG. 2 is a schematic functional block diagram of a controller according to a first embodiment.

FIG. 2 is a schematic functional block diagram of a diagnosis apparatus 1 and a machine learning device 100 according to a first embodiment.

The diagnosis apparatus 1 according to this embodiment includes the configuration which is necessary when the machine learning device 100 diagnoses an operation state of a machine tool (diagnosis mode). Respective functional blocks shown in FIG. 2 are implemented by controlling operations of respective units of the diagnosis apparatus 1 and the machine learning device 100 when the CPU 11 which the diagnosis apparatus 1 includes in FIG. 1 and the processor 101 of the machine learning device 100 execute the respective system programs.

The diagnosis apparatus 1 according to this embodiment includes a control unit 32, a data acquisition unit 34, a preprocessing unit 36, and a characteristic difference calculation unit 38. The machine learning device 100 provided in the diagnosis apparatus 1 includes a diagnosis unit 120 and a learning model selection unit 125. The non-volatile memory 14 shown in FIG. 1 includes an acquisition data memory unit 52 in which data acquired from the machine tool 2, the sensors 3 and the like are stored. The non-volatile memory 104 of the machine learning device 100 shown in FIG. 1 includes a learning model storage unit 130 which stores a learning model constructed by performing machine learning on a learning unit.

The control unit 32 is implemented by having the CPU 11 provided in the diagnosis apparatus 1 shown in FIG. 1 execute system programs read from the ROM 12 so that mainly the CPU 11 execute arithmetic operation processing by use of the RAM 13 and the non-volatile memory 14 and control processing of the machine tool 2 and the sensors 3 via the axis control circuit 30, the spindle control circuit 60 and the PLC 16. The control unit 32 controls an operation of the machine tool 2 and a measurement operation by the sensors 3 based on a control program 54 stored in the non-volatile memory 14 shown in FIG. 1. The control unit 32 has functions for a general control which are required to control operations of respective units of the machine tool 2 such as outputting of a movement command for every control cycle to the servo motor 50 (FIG. 1) and the spindle motor (FIG. 1) which drive the respective axes of the machine tool 2 in accordance with the control program 54. The control unit 32 outputs commands to the sensors 3 so as to make the sensors 3 perform measurement operations. Further, the control unit 32 receives data relating to an operation state of the machine tool 2 from the machine tool 2 and the sensors 3, and outputs the received data to the data acquisition unit 34. The data which the control unit 32 acquires from the machine tool 2 and the sensors 3 and outputs to the data acquisition unit 34 includes, for example, information relating to a tool, information relating to cutting conditions such as a spindle speed, a feed rate, and a cutting amount, information relating to a workpiece such as a material of the workpiece and a shape of the workpiece, electric power consumed by respective motors, vibration, sound, temperatures of respective units of the machine tool and the like which are measured by the sensors 3.

The data acquisition unit 34 is implemented by having the CPU 11 provided in the diagnosis apparatus 1 shown in FIG. 1 execute system programs read from the ROM 12 so that mainly, the CPU 11 executes an arithmetic operation processing by use of the RAM 13 and the non-volatile memory 14. The data acquisition unit 34 stores data relating to an operation state of the machine tool 2 input from the control unit 32 and the like in the acquired data memory unit 52 as acquired data.

The preprocessing unit 36 is implemented by having the CPU 11 provided in the diagnosis apparatus 1 shown in FIG. 1 execute system programs read from the ROM 12 so that mainly, the CPU 11 executes an arithmetic operation processing by use of the RAM 13 and the non-volatile memory 14. The preprocessing unit 36 creates data used in diagnosis of a state of the machine tool 2 in the machine learning device 100 based on data acquired by the data acquisition unit 34. The preprocessing unit 36 creates data by converting (digitalization, sampling or the like) data acquired by the data acquisition unit 34 (also stored in the acquisition data memory unit 52) into a unified form treated by the machine learning device 100, and outputs the created data to the machine learning device 100. For example, the preprocessing unit 36 creates state data S in a predetermined form in such learning when the machine learning device 100 diagnoses an operation state of the machine tool 2.

The characteristic difference calculation unit 38 is implemented by having the CPU 11 provided in the diagnosis apparatus 1 shown in FIG. 1 execute system programs read from the ROM 12 so that mainly, the CPU 11 executes an arithmetic operation processing by use of the RAM 13 and the non-volatile memory 14. The characteristic difference calculation unit 38 calculates characteristic differences between the machine tool 2 and machine tools corresponding to respective learning models based on data acquired by the data acquisition unit 34 and a plurality of learning models stored in the learning model storage unit 130. The characteristic difference calculation unit 38 transmits a command to the control unit 32 so as to make the machine tool 2 perform a predetermined benchmark operation, for example. The characteristic difference calculation unit 38 calculates characteristic differences between the machine tool 2 and the machine tools corresponding to the respective learning models by using data acquired by the machine tool 2 and the sensors 3 at the time of performing the benchmark operation.

The characteristic difference calculation unit 38 may, for example, transmit a command to the diagnosis unit 120 so as to perform a diagnosis of an operation state of the machine tool 2 by using the respective learning models stored in the learning model storage unit 130 based on data acquired by the machine tool 2 and the sensors 3, and may calculate characteristic differences between the machine tool 2 and the machine tools corresponding to the respective learning models based on a result of the diagnosis. Further, the characteristic difference calculation unit 38 may, for example, perform predetermined arithmetic operation between data acquired from the machine tool 2 and the sensors 3 and data which forms the respective learning models stored in the learning model storage unit 130, and may calculate characteristic differences between the machine tool 2 and the machine tools corresponding to the respective learning models based on a result of the arithmetic operation. The characteristic difference calculation unit 38 may perform preprocessing of data acquired from the machine tool 2 and the sensors 3 by the preprocessing unit 36 when necessary.

The diagnosis unit 120 is implemented by having the processor 101 provided in the diagnosis apparatus 1 shown in FIG. 1 execute system programs read from the ROM 102 so that mainly, the processor 101 executes an arithmetic operation processing by the processor 101 by use of the RAM 103 and the non-volatile memory 104. The diagnosis unit 120 diagnoses a state of the machine tool 2 by using a learning model stored in the learning model storage unit 130 based on a state data S created by the preprocessing unit 36. The diagnosis unit 120 according to this embodiment diagnoses an operation state of the machine tool 2 by obtaining a relationship between the state data S input from the preprocessing unit 36 and a learning model by a predetermined arithmetic operation, for example, and outputs the operation state of the machine tool 2. A result of diagnosis obtained from the diagnosis unit 120 is stored in the non-volatile memory 14 or is output to the display/MDI unit 70 for display, for example. When a command is transmitted from the characteristic difference calculation unit 38 to the diagnosis unit 120 so as to make the diagnosis unit 120 diagnose an operation state of the machine tool 2, the diagnosis unit 120 performs processing of diagnosing an operation state of the machine tool 2 between the state data S input from the preprocessing unit 36 and a plurality of respective learning models stored in the learning model storage unit. In this case, a result of a diagnosis performed by the diagnosis unit 120 is output to the characteristic difference calculation unit 38.

The learning model selection unit 125 is implemented by having the processor 101 provided in the diagnosis apparatus 1 shown in FIG. 1 executes the system programs read from the ROM 102 so that mainly, the processor 101 executes arithmetic operation processing by using the RAM 103 and the non-volatile memory 104. The learning model selection unit 125 according to this embodiment selects a learning model used for diagnosing an operation state of the machine tool 2 based on characteristic differences between the machine tool 2 and the machine tools corresponding to the respective learning models, calculated by the characteristic difference calculation unit 38. The learning model selection unit 125 selects a learning model for the machine tool having the least characteristic difference with respect to the machine tool 2 as a learning model used for diagnosing an operation state of the machine tool 2. The selected learning model is used for diagnosing an operation state of the machine tool 2 by the diagnosis unit 120.

An example of a learning model stored in the learning model storage unit 130, an example of diagnosis processing performed by the diagnosis unit 120, an example of calculation processing of characteristic differences by the characteristic difference calculation unit 38, and an example of selection processing of a learning model by the learning model selection unit 125 are described with reference to the drawings.

Figure 3:
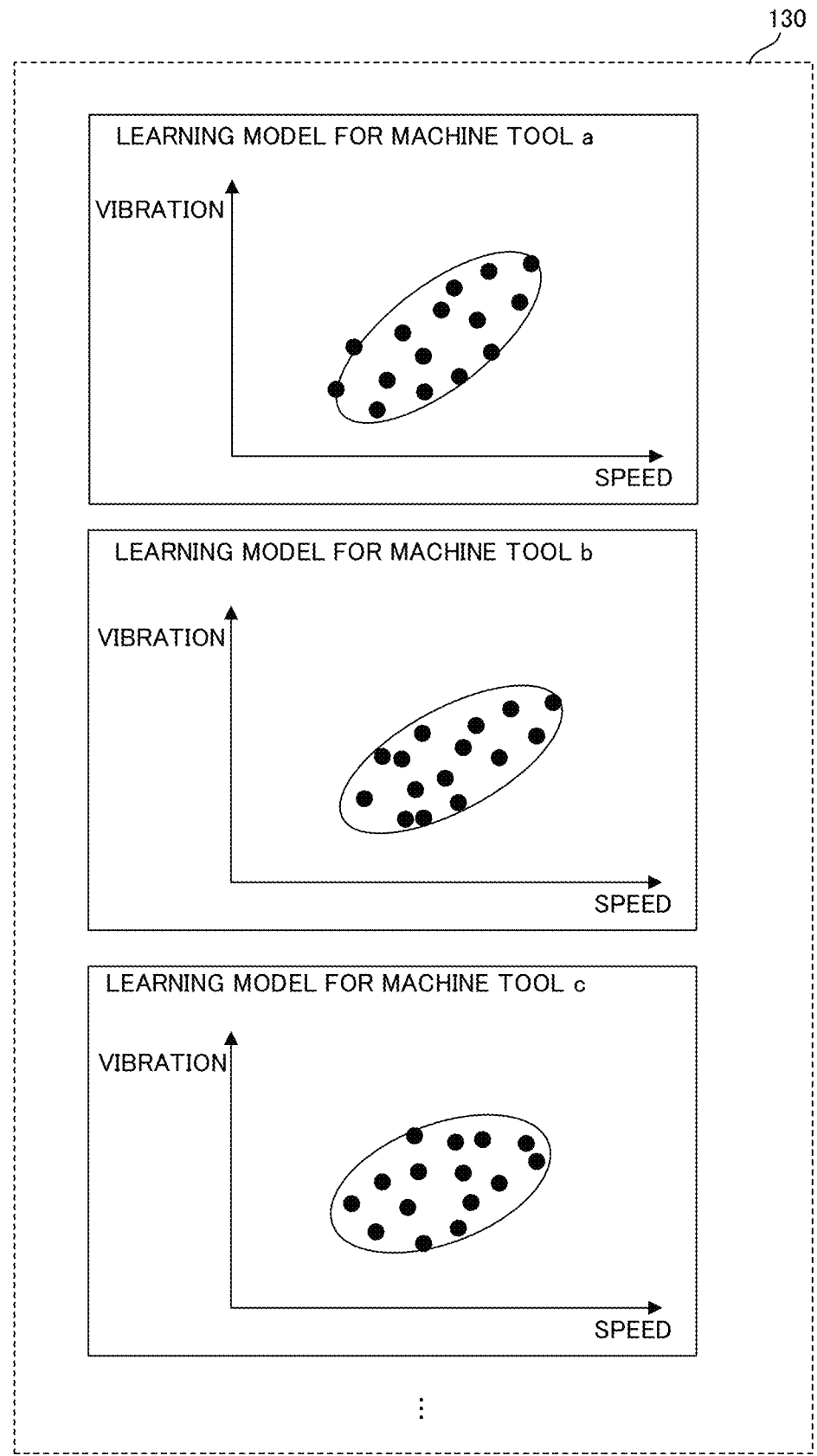
FIG. 3 is a view for describing a learning model stored in a learning model storage unit.

FIG. 3 is an example of a learning model stored in the learning model storage unit 130 in the diagnosis apparatus 1 according to this embodiment.

In the example shown in FIG. 3, a set of data which indicate physical quantities acquired during a normal operation of a machine tool is set as a learning model. In the drawing, black circles indicate data acquired during a normal operation of a machine tool a, and an ellipse indicates a boundary of data set. In FIG. 3, for the sake of brevity, a speed of a motor and vibration generated in a machine tool are indicated as data on physical quantities which form a learning model. However, in an actual operation, a learning model is constructed as a data set which uses data on a larger number of physical quantities.

Figure 4:
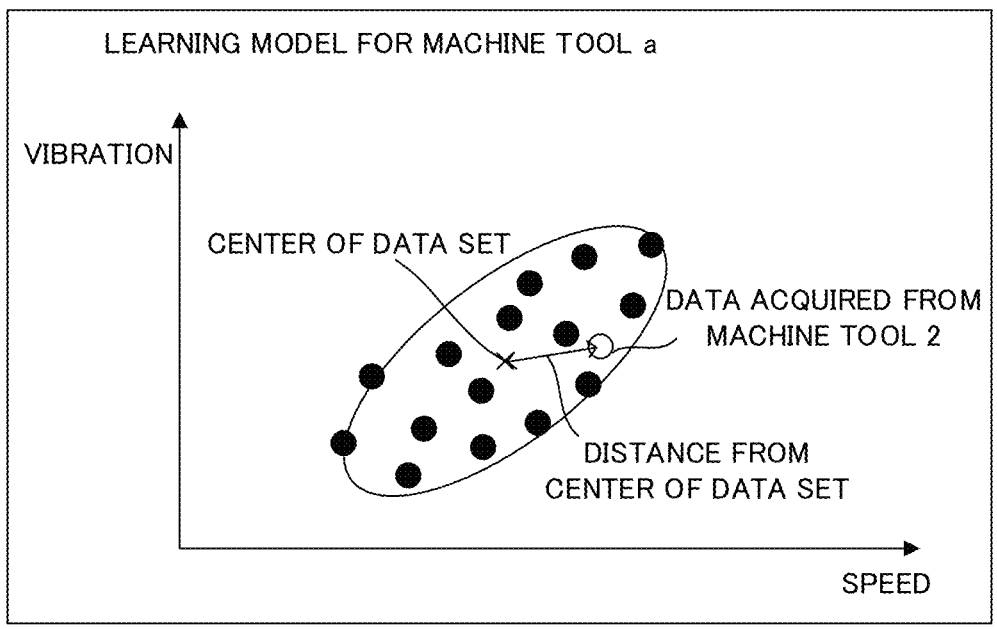
FIG. 4 is a view showing an example where an operation state of a machine tool 2 is diagnosed based on data acquired from the machine tool 2.

FIG. 4 shows an example where an operation state of the machine tool 2 is diagnosed based on data acquired from the machine tool 2 by using the learning model illustrated in FIG. 3.

In the case where the learning model illustrated in FIG. 3 is used in a diagnosis of an operation state of the machine tool 2, for example, the diagnosis unit 120 calculates in which directions the data acquired from the machine tool 2 and the sensors 3 separates away from the center position of the data set which forms the learning model and the separation distance thereof, and calculates degrees of abnormality of the machine tools by using such calculated values as scores. In this case, a weight applied to the calculated score may be changed depending on the direction in which the data separate from the center position of the data set. When the calculated a degree of abnormality exceeds a predetermined first threshold value set in advance, the diagnosis unit 120 diagnoses that an operation of the machine tool is abnormal.

In another example, the diagnosis unit 120 may calculate data density of a data set which forms a learning model at the position of the data acquired from the machine tool 2 and the sensor 3, and may calculate a degree of normality of a machine tool by using the calculated value as a score. In this case, when the calculated degree of normality is smaller than a predetermined second threshold value set in advance, the diagnosis unit 120 may diagnose that an operation of the machine tool is abnormal.

Further, other calculation techniques which use a degree of abnormality (or a degree of normality) may be adopted. Provided that a predetermined comparable value can be calculated as a degree of abnormality (degree of normality) by using a prepared learning model, the diagnosis unit 120 may be formed to use any technique for diagnosing an operation state of the machine tool 2.

In the case where the learning model and the diagnosis method illustrated in FIG. 3 and FIG. 4 are used, the characteristic difference calculation unit 38 commands the diagnosis unit 120 to diagnose an operation state of the machine tool 2 using a plurality of respective learning models stored in the learning model storage unit 130 based on data acquired during a benchmark operation of the machine tool 2. Then, the characteristic difference calculation unit 38 calculates characteristic differences between the machine tool 2 and the machine tools corresponding to the respective learning models based on scores indicating a degree of abnormality (or degree of normality) which the diagnosis unit 120 calculates. The characteristic difference calculation unit 38 may directly use score values which the diagnosis unit 120 calculates as the characteristic differences between the machine tool 2 and the machine tools corresponding to the respective learning models. Further, the characteristic difference calculation unit 38 may acquire a plurality of pieces of data by making the machine tool 2 perform a plurality of operations as benchmark operations, may perform a statistic arithmetic operation (for example, calculation of an average value or the like) with respect to a plurality of score values obtained as a result of a diagnosis of the diagnosis unit 120 based on the respective data, and may use the calculated statistic values as the characteristic differences between the machine tool 2 and the machine tools corresponding to the respective learning models.

Then, the learning model selection unit 125 selects the learning model of the machine tool having the smallest characteristic difference as the learning model used in a diagnosis of an operation state of the machine tool 2 based on the characteristic differences between the machine tool 2 and the machine tools corresponding to the respective learning models which the characteristic difference calculation unit 38 calculates.

The diagnosis apparatus 1 according to this embodiment having the above-mentioned configuration can calculate the characteristic differences between the machine tool 2 and the machine tools corresponding to the respective learning models by using data obtained from the machine tool 2 and a plurality of learning models which have already been constructed in advance, selects the learning model for the machine tool closest to the machine tool 2 based on the calculated characteristic difference, and can use the selected learning model for diagnosing an operation state of the machine tool 2. Accordingly, in newly introducing the machine tool 2, even in a stage before a learning model for the machine tool 2 is constructed, a diagnosis of an operation state of the machine tool 2 can be performed with predetermined accuracy by using a learning model for the machine tool having a small characteristic difference and hence, a cost for constructing the learning model can be reduced.

As one modification of the diagnosis apparatus 1 according to this embodiment, a characteristic difference calculation unit 38 can calculate characteristic differences between a machine tool 2 and machine tools corresponding to respective learning models based on a magnitude of a differential between data acquired from the machine tool 2 when the machine tool 2 is made to perform a predetermined benchmark operation and data acquired from the respective machine tools when the respective machine tools are made to perform predetermined benchmark operations in place of a diagnosis result by a diagnosis unit 120 based on data acquired from the machine tool 2 and sensors 3. In this case, it is necessary to make the respective machine tools perform predetermined benchmark operations in advance respectively and to store the data acquired at this point of time as a portion of the learning model (or together with the learning model). However, this operation may be performed in advance in a step of creating the learning models for respective machine tools. The characteristic difference calculation unit 38 may calculate an average value of a differential of each data value as a value indicating a characteristic difference or may calculate a characteristic difference by giving a weight to each data.

Figure 5:
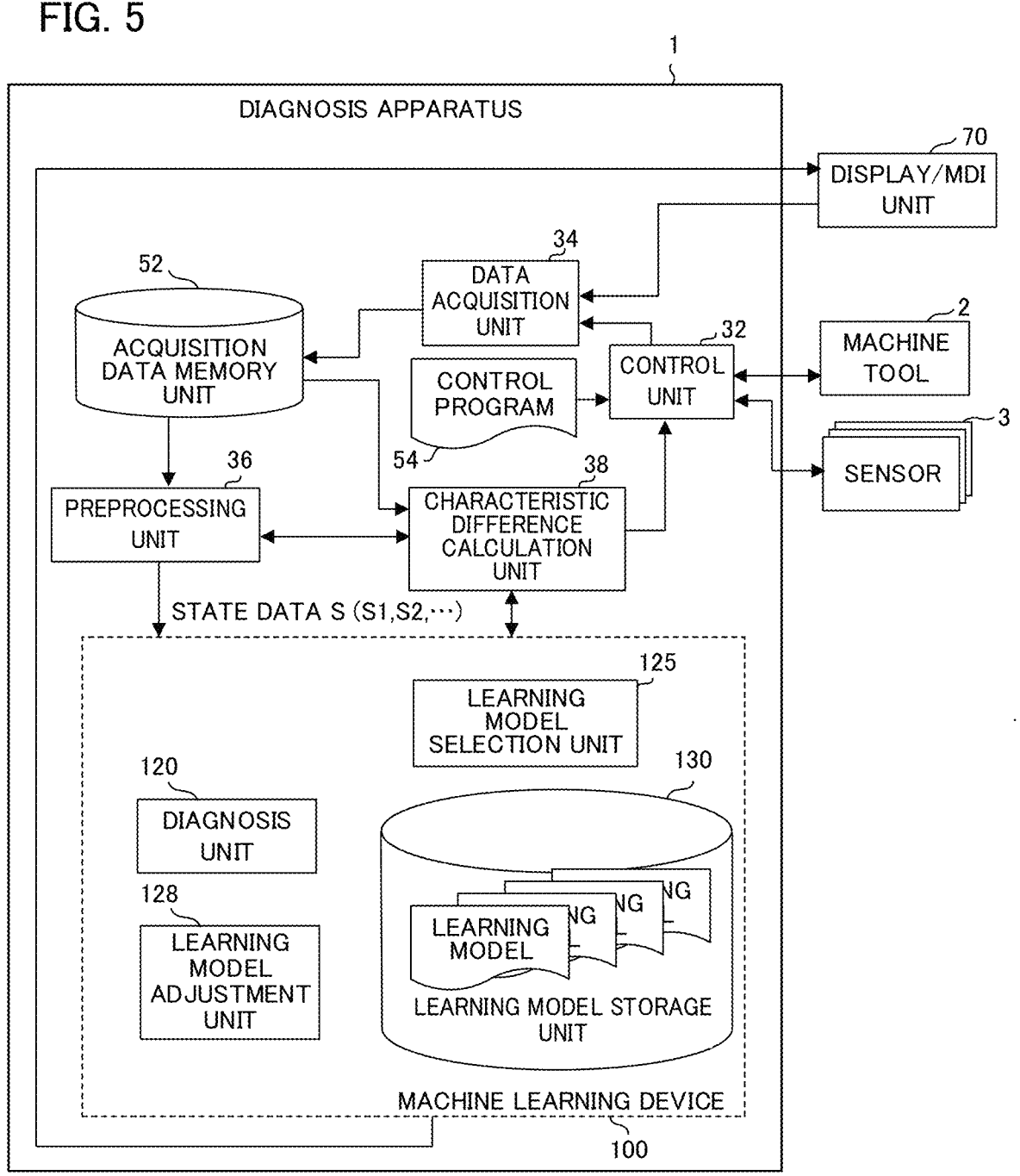
FIG. 5 is a schematic functional block diagram of a diagnosis apparatus according to a second embodiment.

FIG. 5 is a schematic functional block diagram of a diagnosis apparatus 1 and a machine learning device 100 according to a second embodiment.

The diagnosis apparatus 1 according to this embodiment includes the configuration which is necessary when the machine learning device 100 diagnoses an operation state of a machine tool (diagnosis mode). The respective functional blocks shown in FIG. 5 are implemented by a CPU 11 of the diagnosis apparatus 1 shown in FIG. 1 and a processor 101 of the machine learning device 100 which execute respective system programs so as to control operations of respective units of the diagnosis apparatus 1 and the machine learning device 100.

The diagnosis apparatus 1 according to this embodiment includes a learning model adjustment unit 128 in addition to the respective functional means which the diagnosis apparatus 1 according to the first embodiment includes (FIG. 2). A control unit 32, a data acquisition unit 34, a preprocessing unit 36, and a characteristic difference calculation unit 38 which the diagnosis apparatus 1 according to this embodiment includes, and a diagnosis unit 120 and a learning model selection unit 125 which the machine learning device 100 provided in the diagnosis apparatus 1 includes have substantially the same functions as the corresponding functional means in the first embodiment.

The learning model adjustment unit 128 is implemented by having the processor 101 execute system programs read from a ROM 102 so that mainly, the processor 101 executes arithmetic operation processing by using a RAM 103 and a non-volatile memory 104. The learning model adjustment unit 128 adjusts a learning model selected by the learning model selection unit 125 for diagnosis of an operation state of the machine tool 2. The learning model adjustment unit 128 adjusts a learning model selected by the learning model selection unit 125 to a learning model more suitable for diagnosing an operation state of the machine tool 2 based on data indicating an operation state of the machine tool 2.

Figure 6:
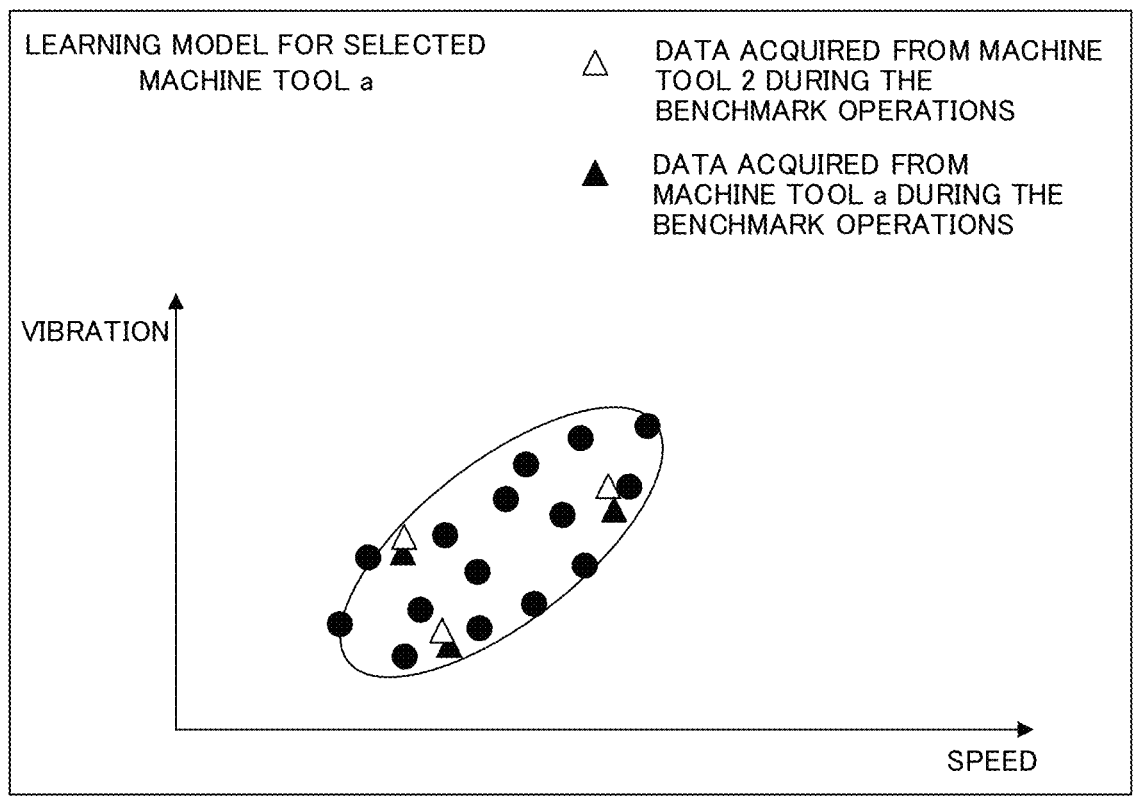
FIG. 6 is a view showing data acquired at the time of performing a benchmark operation of respective machine tools.

FIG. 6 shows an example for adjusting the selected learning model based on data acquired from the machine tool 2.

In FIG. 6, black circles indicate data acquired during a normal operation of a machine tool a, a black triangle indicates data acquired from the machine tool a during a predetermined benchmark operation, and a white triangle indicates data acquired from the machine tool 2 during the predetermined benchmark operation. During a period in which such data are acquired, when the learning model selection unit 125 selects a learning model of the machine tool a for diagnosing an operation state of the machine tool 2, the learning model adjustment unit 128 compares data acquired from the machine tool a during the benchmark operation in the same manner with data acquired from the machine tool 2, and calculates a conversion matrix which converts a data value of a data set of the machine tool a so as to minimize a distance between the respective data.

Figure 7:
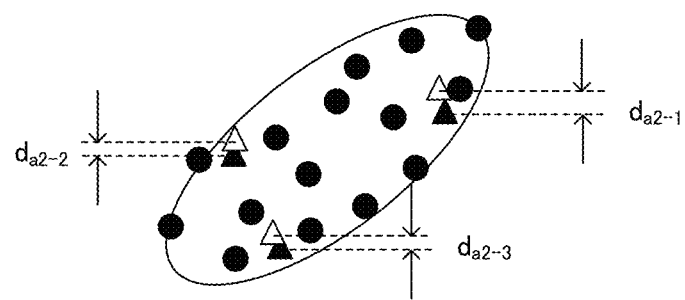
FIG. 7 is a view describing a method of forming a translation matrix.

The learning model adjustment unit 128 may calculate a translation matrix which makes a differential of data acquired during the respective benchmark operations minimum as the conversion matrix, for example. In this case, for example, as illustrated in FIG. 7, a differential between data acquired from the machine tool a and data acquired from the machine tool 2 during respective benchmark operations is calculated for every data axis, and the conversion matrix which moves data for respective data axis by an average value of the calculated differential may be calculated. In the example shown in FIG. 7, during a benchmark operation, differentials $d_{a2\text{-}1}$, $d_{a2\text{-}2}$, $d_{a2\text{-}3}$ of data values of vibrations acquired from the machine tool a and the machine tool 2 respectively are obtained respectively. An average of a differential of a data value may be obtained in the same manner also with respect to other data axes, and a conversion matrix which moves data with respect to the respective data axes by a calculated differential average amount may be calculated.

Figure 8:
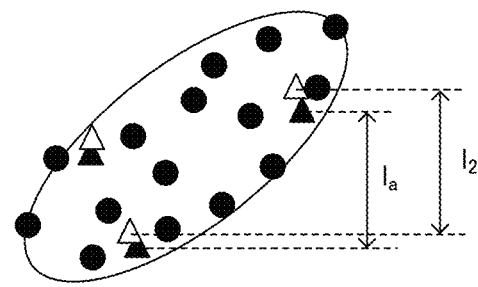
FIG. 8 is a view for describing a method for forming an expansion/reduction matrix.

The learning model adjustment unit 128 may calculate an expansion/reduction matrix which can minimize a differential of data acquired during the respective benchmark operations as a conversion matrix, for example. In this case, for example, as illustrated in FIG. 8, during the respective benchmark operations, a differential between a maximum value and a minimum value of data (data width) acquired by the machine tool a and a differential between a maximum value and a minimum value of data acquired by the machine tool 2 may be calculated for every data axis, and a conversion matrix which expands or reduces data by a ratio of calculated differentials may be calculated. In the example shown in FIG. 8, a ratio $l_2/l_a$ between the differential $l_a$ between the maximum value and the minimum value of the data acquired from the machine tool a and the differential $l_2$ between the maximum value and the minimum value of the data acquired from the machine tool 2 is obtained during the benchmark operation. A ratio of data widths is obtained substantially in the same manner also with respect to other data axes, and a conversion matrix which expands or reduces data by a calculated amount of ratio with respect to the respective data axes may be calculated.

The conversion matrix may be a combination of a translation matrix and an expansion/reduction matrix. To adopt such a combined matrix, firstly, the expansion/reduction matrix may be obtained, the learning model may be adjusted by the expansion/reduction matrix, and a translation matrix may be further obtained with respect to the adjusted learning model.

Then, the learning model adjustment unit 128 converts values of the respective data which form the learning model of the machine tool a by using the calculated conversion matrix and adjusts the learning model to the learning model for the machine tool 2. To allow the learning model adjustment unit 128 to perform adjustment processing, it is necessary to make the respective machine tools perform a predetermined benchmark operations in advance and store data acquired at this operation as data at the time of benchmark operation. This operation may be performed in advance in a step of creating a learning model for respective machine tools, and the data thus acquired may be stored in association with respective learning models stored in the learning model storage unit 130.

The diagnosis apparatus 1 according to this embodiment having the above-mentioned configuration calculates characteristic differences between the machine tool 2 and the machine tools corresponding to the respective learning models by using data acquired from the machine tool 2 and a plurality of learning models which have already been constructed, and selects the learning model for the machine tool closest to the machine tool 2 based on the characteristic differences. Then, the selected learning model is adjusted to a learning model more suitable for diagnosing an operation state of the machine tool 2. Accordingly, in newly introducing the machine tool 2, even in a stage before a learning model for the machine tool 2 is constructed, a diagnosis of an operation state of the machine tool 2 can be performed with predetermined accuracy by using a learning model for the machine tool having a small characteristic difference.

Figure 9:
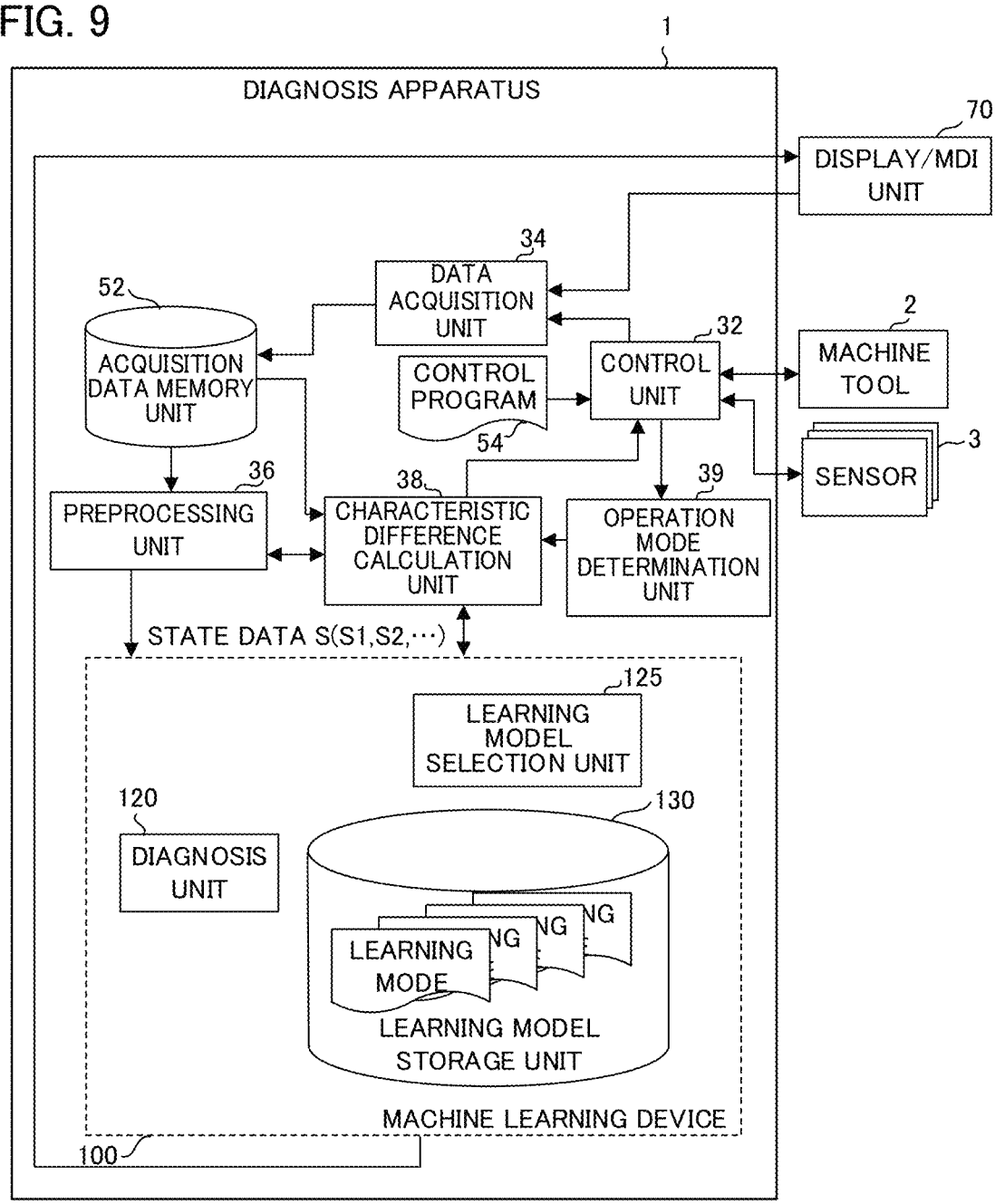
FIG. 9 is a schematic functional block diagram of a diagnosis apparatus according to a third embodiment.

FIG. 9 is a schematic functional block diagram of a diagnosis apparatus 1 and a machine learning device 100 according to a third embodiment.

The diagnosis apparatus 1 according to this embodiment includes the configuration which is necessary when the machine learning device 100 diagnoses an operation state of a machine tool (diagnosis mode). The respective functional blocks shown in FIG. 9 are implemented by a CPU 11 of the diagnosis apparatus 1 shown in FIG. 1 and a processor 101 of the machine learning device 100 which execute respective system programs so as to control operations of respective units of the diagnosis apparatus 1 and the machine learning device 100.

The diagnosis apparatus 1 according to this embodiment includes an operation mode determination unit 39 in addition to the respective functional means which the diagnosis apparatus 1 according to the first embodiment includes (FIG. 2). A control unit 32, a data acquisition unit 34, and a preprocessing unit 36 which the diagnosis apparatus 1 according to this embodiment includes, and a diagnosis unit 120 and a learning model selection unit 125 which the machine learning device 100 provided in the diagnosis apparatus 1 includes have substantially the same functions as the corresponding functional means in the first embodiment. Further, the learning model storage unit 130 stores learning models which are constructed for every operation modes of respective machine tools in advance.

The operation mode determination unit 39 is implemented by having a CPU 11 provided in the diagnosis apparatus 1 shown in FIG. 1 execute system programs read from a ROM 12 so that mainly, the CPU 11 executes an arithmetic operation processing by using the RAM 13 and the non-volatile memory 14. The operation mode determination unit 39 determines an operation mode of a machine tool 2 based on data relating to operation states of the machine tool 2 and sensors 3 acquired from a control unit 32, and adjusts a learning model selected by a learning model selection unit 125 for diagnosing an operation state of the machine tool 2. In this embodiment, the operation mode indicates a tendency of an operation corresponding to an application of the machine tool 2, for example. Such operation mode may include, for example, high speed working mode, a precision working mode or the like. The operation mode may indicate a tendency of an environment where the machine tool 2 is operated. In this case, such operation mode may include, for example, a high-temperature environment, a high-vibration environment and the like. The operation mode determination unit 39 determines an operation mode of the machine tool 2 and outputs a determined operation mode to a characteristic difference calculation unit 38, based on setting relating to a control of the machine tool 2 set in a region where a non-volatile memory 14 is set, setting relating to a control of the machine tool 2 set in accordance with a command from a control program 54, detection values relating to an operation environment of the machine tool 2 detected by sensors 3, and the like.

The characteristic difference calculation unit 38 according to this embodiment sets, corresponding to an operation mode input from the operation mode determination unit 39, only a learning model prepared in the above-mentioned operation mode from a plurality of learning models stored in the learning model storage unit 130 as a calculation object of a characteristic difference. The characteristic difference calculation unit 38 according to this embodiment has substantially the same functions as the functions of the characteristic difference calculation unit 38 provided in the diagnosis apparatus 1 according to the first embodiment, except that the operation mode is taken into account.

The diagnosis apparatus 1 according to this embodiment having the above-mentioned configuration calculates a characteristic difference between the machine tool 2 and the machine tools corresponding to the respective learning models by using data acquired from the machine tool 2 and learning models for a plurality of respective operation modes which have already been constructed in advance in a predetermined operation mode, and selects the learning model for the machine tool closest to the machine tool 2 based on the characteristic difference. Accordingly, in newly introducing the machine tool 2, even in a stage before a learning model in a predetermined operation mode of the machine tool 2 is constructed, a diagnosis of an operation state of the machine tool 2 can be performed by using a learning model in a predetermined operation mode for the machine tool having a small characteristic difference with predetermined accuracy.

Hereinafter, an embodiment (forth embodiment) is described in which the configurations included in the diagnosis apparatuses 1 according to the first to third embodiments described above are implemented as systems which are arranged in a dispersed manner in a plurality of devices including a cloud server, a host computer, a fog computer, an edge computer (robot controller, controller and the like).

Figure 10:
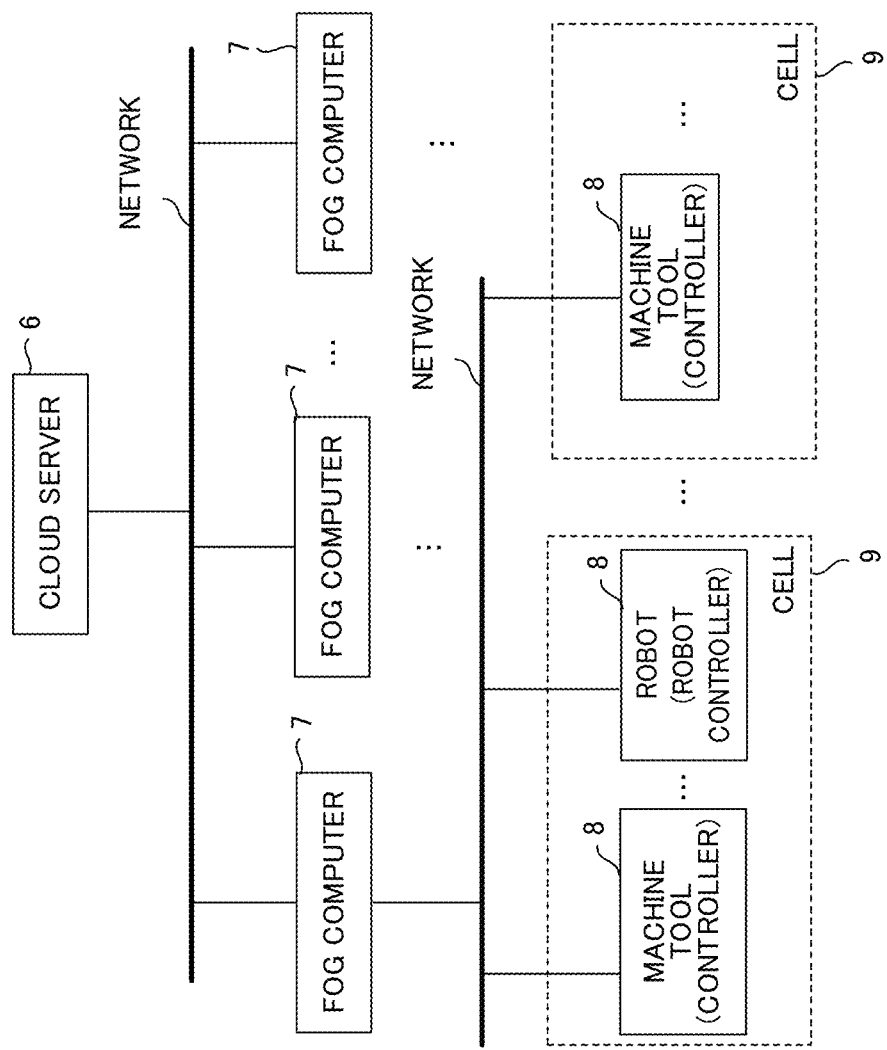
FIG. 10 is a block diagram showing an example of a system having a three-layered structure including a cloud server, a fog computer, and an edge computer.

As illustrated in FIG. 10, in the fourth embodiment described hereinafter, it is assumed that a system is configured such that a plurality of respective devices are respectively formed of logically divided three layers in a state where a plurality of respective devices are connected to a network. These layers consist of a layer which includes a cloud server 6 or the like, a layer which includes a fog computer 7 or the like, and a layer which includes an edge computer 8 (robot controller contained in a cell 9, controller and the like). In such a system, the diagnosis apparatus 1 according to a mode of the present invention is mountable on any one of the cloud server 6, the fog computer 7, and the edge computer 8. In this system illustrated in FIG. 10, a plurality of cells 9 are provided in factories located at respective places, and the respective cells are controlled by the fog computer 7 in a high order layer at a predetermined unit (such as factory unit, a plurality of factory units of the same manufacturer). Then, data collected and analyzed by these fog computers 7 are further collected and analyzed by the cloud server 6 in higher order layer, and the resultant information can be utilized in controlling or the like at respective edge computers 8.

Figure 11:
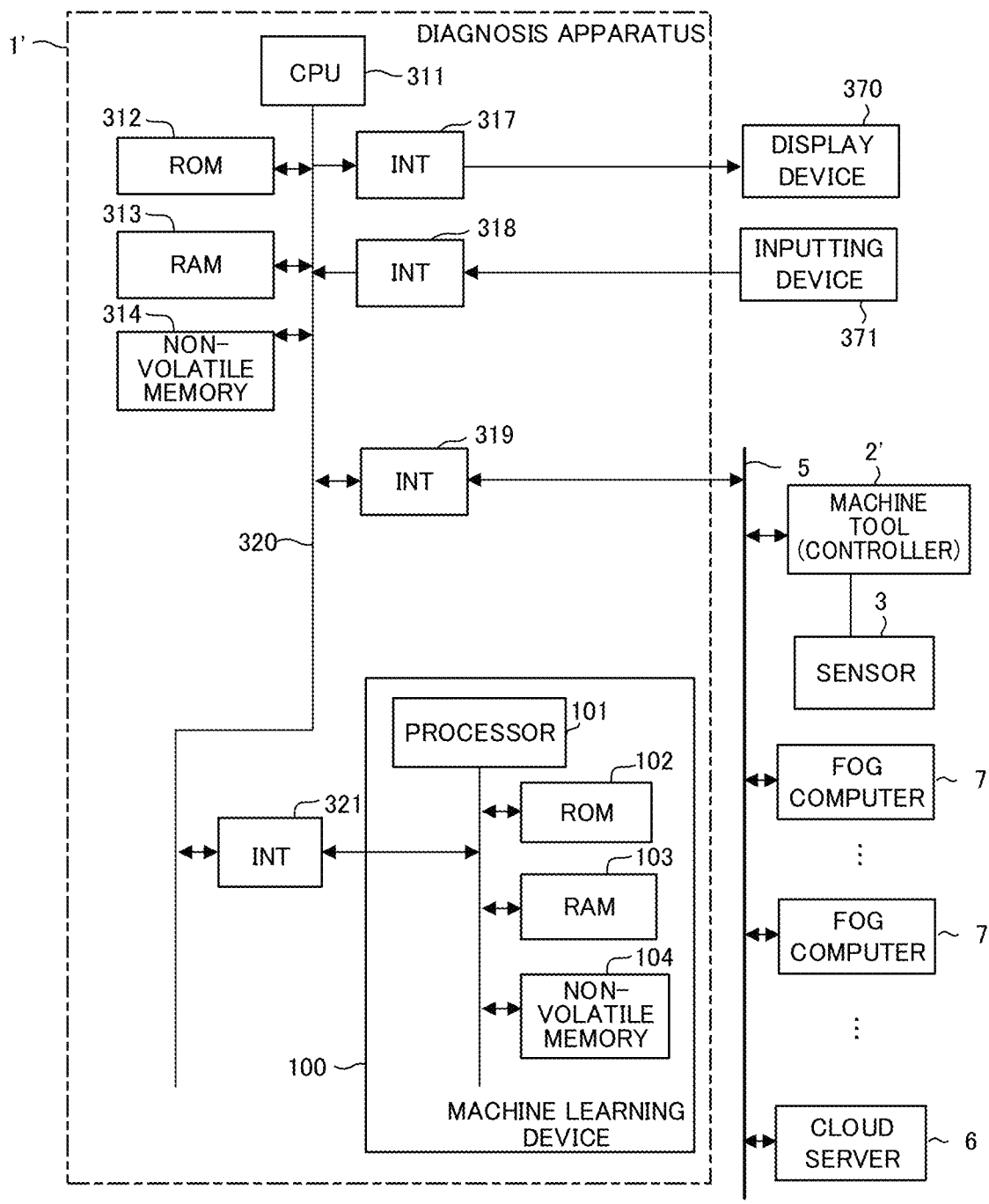
FIG. 11 is a hardware configuration diagram showing a schematic hardware configuration of a diagnosis apparatus in a state where the diagnosis apparatus is mounted in a computer.

FIG. 11 is a hardware configuration diagram of a schematic hardware configuration when a diagnosis apparatus 1' is mounted on a computer such as a cloud server, a fog computer or the like.

A CPU 311 provided in the diagnosis apparatus 1' mounted on the computer in this embodiment is a processor which controls the diagnosis apparatus 1' in a comprehensive manner. The CPU 311 reads a system program stored in a ROM 312 via a bus 320, and controls the diagnosis apparatus 1' in a comprehensive manner in accordance with the system program. Temporary calculation data and display data, and various data and the like which an operator inputs via an inputting unit not shown in the drawing are temporarily stored in the RAM 313.

A non-volatile memory 314 is, for example, formed as a memory which is backed up by a battery (not shown in the drawing) or the like so that a memory state is held even when a power source of the diagnosis apparatus 1' is turned off. In the non-volatile memory 314, a program input via an inputting device 371 and various data acquired from a machine tool 2' (and a sensor 3) via a respective units of the diagnosis apparatus 1' and a network 5 are stored. The program and the various data stored in the non-volatile memory 314 may be developed in the RAM 313 at the time of executing or using the program and the various data. Various system programs such as known analyzing programs (including a system program for controlling data exchange with a machine learning device 100 described later) are written in the ROM 312 in advance.

The diagnosis apparatus 1' is connected to a wired/wireless network 5 via an interface 319. To a network 5, at least one machine tool 2' (the machine tool provided with a controller), other diagnosis apparatus 1, an edge computer 8, a fog computer 7, a cloud server 6 and the like are connected and data exchange is made with the diagnosis apparatus 1'.

Various data read on the memory, data obtained as a result of execution of programs and the like are output to a display device 370 via an interface 317 and are displayed on the display device 370. An inputting device 371 which is formed of a keyboard, a pointing device and the like transfers a command, data and the like based on an operation by an operator to the CPU 311 via an interface 318.

An interface 321 is an interface for connecting the CPU 311 and the machine learning device 100. The machine learning device 100 has substantially the same configuration as the machine learning device 100 described with reference to FIG. 1.

In this manner, in the case where the diagnosis apparatus 1' is mounted on a computer such as a cloud server or a fog computer, the diagnosis apparatus 1' has functions substantially same as the functions of the diagnosis apparatus 1 described in the first to the third embodiments (FIG. 2, FIG. 5, FIG. 9), except that data exchange between the machine tool 2' and the sensor 3 is performed via the network 5. In this case, since the machine tool 2' has a controller, a control unit 32 provided in the diagnosis apparatus 1' does not perform a control of the machine tool 2', but acquires information relating to an operation state of the machine tool 2' from the controller provided in the machine tool 2'. Further, the control unit 32 provided in the diagnosis apparatus 1' performs an indirect control of the sensors 3 via the controller provided in the machine tool 2', and acquires measurement values by the sensors 3 via the controller provided in the machine tool 2'.

Then, the diagnosis apparatus 1' selects a learning model suitable for diagnosing an operation state of the machine tool 2' connected to the diagnosis apparatus 1' via the network from a plurality of learning models stored in a learning model storage unit 130 in advance, and performs a diagnosis of an operation state of the machine tool 2' by using the learning model. Since the diagnosis apparatus 1' can perform a diagnosis of operation states of a plurality of machine tools 2' via the network, it is unnecessary to provide the machine learning device 100 to the controllers which control the respective machine tools 2'. Accordingly, a cost of manufacturing each machine tool 2' can be lowered.

Although the several embodiments of the present invention have been described heretofore, the present invention is not limited to the above-mentioned examples of the embodiments, and the present invention can be carried out in various modes by adding suitable changes.

For example, in the above-mentioned embodiments, diagnosis apparatus 1 and the machine learning device 100 are described as the devices which respectively have different CPUs (processor). However, the machine learning device 100 may be implemented by the CPU 11 provided in the diagnosis apparatus 1 and a system program stored in the ROM 12.

Further, in the above-mentioned embodiment, the embodiment is exemplified where the learning model storage unit 130 which stores the plurality of learning models is mounted on the machine learning device 100. However, for example, instead of mounting the learning model storage units 130 on the diagnosis apparatuses 1 or 1', the learning model storage unit 130 may be mounted on the higher-order fog computer 7 or the cloud server 6 so that the learning model storage units 130 are shared in common by a plurality of diagnosis apparatuses 1 or 1'. With such a configuration, the learning models can be managed on a host computer of a manufacturer or on a cloud server which a manufacturer of machine tools runs and hence, users who introduce the diagnosis apparatuses 1 or 1' can utilize the learning models in common whereby a running cost of the whole system can be reduced.

Further, in the above-mentioned embodiment, the example of the diagnosis apparatus which diagnoses a normality/abnormality state of the machine tool is exemplified. However, the present invention is not limited to such an example and is also suitably applicable to examples which perform a predetermined diagnosis relating to industrial machines. For example, as the industrial machines, besides the machine tool, the present invention is applicable to other industrial machines such as an electric discharging machine, an injection molding machine, a conveyance robot, a coating robot and the like. Further, the present invention is also applicable to a diagnosis of a thermal change state of an industrial machine, for example. In this case, for example, a thermal change state of respective units when the units are made to perform predetermined operations as a benchmark operations is acquired as state data S, and a characteristic difference may be calculated based on a difference between the state data S and state data of each industrial machine stored as the learning model when a benchmark operation is performed.

The invention claimed is:

1. A diagnosis apparatus for diagnosing an operation of a machine, the diagnosis apparatus comprising:
   a learning model storage unit configured to store a plurality of learning models generated by performing machine learning on physical quantities of a plurality of machines observed during respective operations of the plurality of machines in advance;
   a data acquisition unit configured to acquire a physical quantity of another machine different from the plurality of machines observed during an operation of the other machine;
   a characteristic difference calculation unit configured to calculate characteristic differences between the other machine and the plurality of respective machines using the physical quantity relating to an operation of the other machine acquired by the data acquisition unit and the learning models stored in the learning model storage unit;
   a learning model selection unit configured to select a learning model used in a diagnosis of the operation of the other machine based on the characteristic differences calculated by the characteristic difference calculation unit; and
   a diagnosis unit configured to diagnose the operation of the other machine by using the learning model selected by the learning model selection unit.

2. The diagnosis apparatus according to claim 1, wherein the diagnosis unit diagnoses a normal state or an abnormal state of the other machine.

3. The diagnosis apparatus according to claim 1, further comprising a learning model adjustment unit configured to adjust the learning model selected by the learning model selection unit to be adaptable to a diagnosis of the operation of the other machine based on the physical quantity relating to the operation of the other machine acquired by the data acquisition unit.

4. The diagnosis apparatus according to claim 1, further comprising an operation mode determination unit configured to determine an operation mode of the other machine, wherein
   the plurality of learning models for respective operation modes generated by performing machine learning on physical quantities observed during operations in the respective operation mode are stored in the learning model storage unit with respect to the plurality of machines in advance, and
   the characteristic difference calculation unit is configured to calculate the characteristic differences by using the learning models generated by the same operation mode as the operation mode determined by the operation mode determination unit.

5. A diagnosis method for diagnosing an operation of a machine comprising:
   a step of acquiring a physical quantity observed during an operation of a first machine;
   a step of calculating, using the physical quantity relating to an operation of the first machine acquired in the step of acquiring the physical quantity and a plurality of learning models generated in advance by performing machine learning on physical quantities observed during respective operations of a plurality of machines which differ from the first machine, characteristic differences between the first machine and the plurality of respective machines;
   a step of selecting a learning model used in a diagnosis of the operation of the first machine based on the characteristic differences calculated in the step of calculating the characteristic differences; and
   a step of diagnosing the operation of the first machine using the learning model selected in the step of selecting the learning model.

* * * * *